United States Patent [19]

Takuma et al.

[11] Patent Number: 4,883,611
[45] Date of Patent: Nov. 28, 1989

[54] DICHROIC COLORING AGENTS FOR LIQUID CRYSTAL DISPLAYS

[75] Inventors: Keisuke Takuma; Sizuo Kuroda; Tsukasa Oyama; Hiroshi Aiga, all of Ohmuta, Japan

[73] Assignee: Mitsui Toatsu Chemicals, Incorporated, Tokyo, Japan

[21] Appl. No.: 242,289

[22] Filed: Sep. 9, 1988

[30] Foreign Application Priority Data

Sep. 16, 1987 [JP] Japan .................... 62-229825
Dec. 18, 1987 [JP] Japan .................... 62-318705

[51] Int. Cl.⁴ .............. C09K 19/00; C07C 101/80; C09B 1/16; C09B 1/60
[52] U.S. Cl. ................... 552/235; 252/299.1
[58] Field of Search ............. 252/299.1; 260/376, 260/377; 350/349

[56] References Cited

U.S. PATENT DOCUMENTS

| | | | |
|---|---|---|---|
| 4,304,683 | 12/1981 | Morinaka et al. | 252/299.1 |
| 4,360,447 | 11/1982 | Morinaka et al. | 252/299.1 |
| 4,363,743 | 12/1982 | Moeller et al. | 252/299.1 |
| 4,459,218 | 7/1984 | Yamada et al. | 252/299.1 |
| 4,473,486 | 9/1984 | Morinaka et al. | 252/299.1 |
| 4,495,083 | 1/1985 | Imazeki et al. | 252/299.1 |
| 4,507,221 | 3/1985 | Imazeki et al. | 252/299.1 |
| 4,528,113 | 7/1985 | Imazeki et al. | 252/299.1 |
| 4,536,320 | 8/1985 | Nishizawa et al. | 252/299.1 |
| 4,552,684 | 11/1984 | Yamada et al. | 252/299.1 |
| 4,555,355 | 11/1985 | Yamada et al. | 252/299.1 |
| 4,585,574 | 4/1986 | Blunck et al. | 252/299.1 |
| 4,596,666 | 6/1986 | Blunck et al. | 252/299.1 |
| 4,610,804 | 9/1986 | Imazeki et al. | 252/299.1 |
| 4,613,208 | 9/1986 | Boller et al. | 252/299.1 |
| 4,734,218 | 3/1988 | Takuma et al. | 252/299.61 |

FOREIGN PATENT DOCUMENTS

| | | | |
|---|---|---|---|
| 57-198776 | 12/1982 | Japan . | |
| 57-198777 | 12/1982 | Japan . | |
| 57-198778 | 12/1982 | Japan . | |
| 58-42684 | 3/1983 | Japan . | |
| 58-145759 | 8/1983 | Japan . | 260/376 |
| 58-187456 | 11/1983 | Japan . | |
| 59-4650 | 1/1984 | Japan . | |
| 59-4651 | 1/1984 | Japan . | |
| 59-179561 | 10/1984 | Japan . | |

Primary Examiner—John F. Terapane
Assistant Examiner—J. E. Thomas
Attorney, Agent, or Firm—Fisher, Christen & Sabol

[57] ABSTRACT

Dichroic coloring agents which have a blue to blue-violet hue and have not been used to date for liquid crystal displays are disclosed. These coloring agents are represented by the following formula:

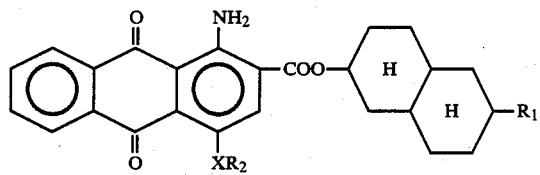

wherein X is S or NH; $R_1$ is a hydrogen atom, halogen atom, alkyl group or alkoxy group; and $R_2$ is a hydrogen atom, alkyl group, aryl group or aralkyl group.

12 Claims, No Drawings

DICHROIC COLORING AGENTS FOR LIQUID CRYSTAL DISPLAYS

BACKGROUND OF THE INVENTION (1) Field of the Invention

This invention relates to dichroic coloring agents having a blue to blue violet hue for use in liquid crystals.

(2) Description of the Prior Art

Recently, liquid crystal display elements have been widely used for a variety of variable displays from the energy saving and miniaturization viewpoints. Most of the liquid crystal display elements now being used utilize the electro-optic effect of twisted nematic type liquid crystals. A combination of two polarizing plates is required in this type of display systems and actually causes many limitations in use. The so-called guest-host system has been examined as an alternative liquid crystal display system. The guest-host system utilizes the electro-optic effect of a colored liquid crystal composition obtained by dissolving a dichroic coloring agent in a nematic liquid crystal. The guest-host system has already been utilized in part as display elements for clocks, electric and electronic appliances, industrial meters and other uses.

The principle of the guest-host type liquid crystal display system is to arrange guest molecules of the dichroic coloring agent in oriented states depending on the configuration of the host molecules of the liquid crystal. The molecules of liquid crystals change direction of their orientation from the OFF state to the ON stage usually by applying the external stimulus of an electric field. At the same time, the molecules of the dichroic coloring agent also change the direction of their orientation. Consequently, the degree of light absorption by the molecules of the coloring agent varies between the OFF and ON states and excites the display, which is the principle of the guest-host system.

The minimum requirements for the dichroic coloring agent to be used are to provide such essential conditions as:

(a) having sufficient tinting strength in small amounts,
(b) exhibiting a sharp contrast,
(c) having sufficient compatibility with the liquid crystal, and
(d) being excellent in durability and stability and not degrading performance of the display unit after long use.

Various kinds of dichroic coloring agents have been proposed to meet the above conditions, and some of them have already been used for digital clocks, meters and other applications. However, coloring agents exhibiting a high dichroic ratio are poor in durability, whereas those having excellent durability are too weak in dichroism to exhibit a clear display in practice. Many of these coloring agents still have disadvantages to be overcome.

SUMMARY OF THE INVENTION

The present inventors conducted intensive research into overcoming the above disadvantages and found dichroic coloring agents which have a high dichroic ratio, excellent durability and a blue to blue violet hue, and which are to date unknown for use in liquid crystal displays. The present invention provides dichroic coloring agents for liquid crystal displays represented by the formula (I):

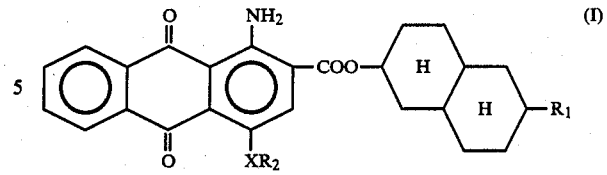

wherein X is S or NH; $R_1$ is a hydrogen atom, halogen atom, alkyl group or alkoxy group; and $R_2$ is a hydrogen atom, alkyl group, aryl group or aralkyl group.

The characteristic of the dichroic coloring agents in this invention is that an ester group containing a decahydronaphthyl group is introduced to the 2-position of an anthraquinone ring. By introducing the ester group, the coloring agent of this invention shows a marked increase in dichroic ratio and a remarkable improvement in durability compared with similar anthraquinone base dichroic coloring agents which are already known. Therefore the dichroic coloring agents of this invention are very valuable in practice.

DETAILED DESCRIPTION OF THE INVENTION

As described above, the present invention relates to dichroic coloring agents having a blue to blue violet hue for use in liquid crystals. These coloring agents are represented by the formula (I) as defined above.

Representative examples of $R_1$ in formula (I) include a hydrogen atom, fluorine atom, chlorine atom, methyl group, ethyl group, n-pentyl group, n-heptyl group, n-octyl group, n-nonyl group, 3,5,5-trimethylhexyl group, methoxy group, ethoxy group and butoxy group. Examples of $R_2$ include a hydrogen atom, methyl group, ethyl group, butyl group, phenyl group, 4-ethylphenyl group, 4-ethoxyphenyl group, benzyl group, 4-ethylbenzyl group, and 4-ethoxybenzyl group.

Anthraquinone base coloring agents wherein X is NH in formula (I) include, for example, 1,4-diamino-2-(decahydro-2-naphthyloxy)carbonylanthraquinone, 1,4-diamino-2-(trans-decahydro-2-naphthyloxy)carbonylanthraquinone, 1-amino-2-(trans-decahydro-2-naphthyloxy)carbonyl-4-methylaminoanthraquinone, 1-amino-2-(trans-decahydro-2-naphthyloxy)carbonyl-4-ethylaminoanthraquinone, 1-amino-2-(decahydro-2-naphthyloxy)carbonyl-4-(4-methylphenyl)aminoanthraquinone, 1-amino-2-(trans-decahydro-2-naphthyloxy)carbonyl-4-(4-ethoxyphenyl)aminoanthraquinone, 1-amino-2-(transdecahydro-2-naphthyloxy)carbonyl-4-(4-chlorophenyl)-aminoanthraquinone, 1-amino-2-(trans-decahydro-2-naphthyloxy)carbonyl-4-benzylaminoanthraquinone, 1-amino-2-(trans-decahydro-2-naphthyloxy)carbonyl-4-(4-methylbenzyl)-aminoanthraquinone, 1-amino-2-(decahydro-2-naphthyloxy)carbonyl-4-(4-methylphenetyl)aminoanthraquinone, 1,4-diamino-2-(6-chloro-decahydro-2-naphthyloxy)carboxylanthraquinone, 1,4-diamino-2-trans-6-chloro-decahydro-2-naphthyloxy)carbonylanthraquinone, 1-amino-2-(trans-6-chloro-decahydro-2-naphthyloxy)carbonyl-4-methylaminoanthraquinone, 1-amino-2-(trans-6-chloro-decahydro-2-naphthyloxy)-carbonyl-4-ethylaminoanthraquinone, 1-amino-2-(6-chloro-decahydro-2-naphthyloxy)carbonyl-4-(4-methylphenyl)-aminoanthraquinone, 1-amino-2-(trans-6-fluorodecahydro-2-naphthyloxy)carbonyl-4-(4-ethoxyphenyl)aminoanthraquinone, 1-amino-2-(trans-6-fluoro-decahydro-2-naphthyloxy)carbonyl-4-(4-chlorophenyl)aminoanthraquinone, 1-amino-2-(trans-6-fluoro-decahydro-2-naphthyloxy)carbonyl-4-benzylaminoanthraquinone, 1-amino-2-(trans-6-bromo-decahydro-2-naphthyloxy)carbonyl-4-(4-methylbenzyl)aminoanthraquinone, 1-amino-2-(6-bromo-decahydro-2-naphthyloxy)carbonyl-4-(4-methylphenethyl)aminoanthraquinone, 1,4-diamino-2-(6-methyl-decahydro-2-naphthyloxy)carbonylanthraquinone, 1,4-diamino-2-(trans-6-methyl-decahydro-2-naphthyloxy)-carbonylanthraquinone, 1-amino-2-(trans-6-methyl-decahydro-2-naphthyloxy)carbonyl-4-methylaminoanthraquinone, 1-amino-2-(trans-6-methyl-decahydro-2-naphthyloxy)carbonyl-4-butylaminoanthraquinone, 1-amino-2-(6-methyl-decahydro-2-naphthyloxy)carbonyl-4-(4-methylphenyl)aminoanthraquinone, 1-amino-2-(trans-6-ethyl-decahydro-2-naphthyloxy)carbonyl-4-(4-butoxyphenyl)aminoanthraquinone, 1-amino-2-(trans-6-ethyl-decahydro-2-naphthyloxy)carbonyl-4-(4-chlorophenyl)aminoanthraquinone, 1-amino-2-(trans-6-butyl-decahydro-2-naphthyloxy)carbonyl-4-benzylaminoanthraquinone, 1-amino-2-(trans-6-isopropyl-decahydro-2-naphthyloxy)carbonyl-4-(4-methylbenzyl)aminoanthraquinone, 1-amino-2-(6-isobutyl-decahydro-2-naphthyloxy)-carbonyl- 4-(4-methylphenethyl)aminoanthraquinone, 1,4-diamino-2-(6-methoxy-decahydro-2-naphthyloxy)-carbonylanthraquinone. 1,4-diamino-2-(trans-6-methoxy-decahydro-2-naphthyloxy)carbonylanthraquinone, 1-amino-2-(trans-6-methoxy-decahydro-2-naphthyloxy)-carbonyl-4-methylaminoanthraquinone, 1-amino-2-(trans-6-methoxy-decahydro-2-naphthyloxy)-carbonyl-4-ethylaminoanthraquinone, 1-amino-2-(6-methoxy-decahydro-2-naphthyloxy)carbonyl-4-(4-methylphenyl)aminoanthraquinone, 1-amino-2-(trans-6-ethoxy-decahydro-2-naphthyloxy)carbonyl-4-(4-ethoxyphenyl)aminoanthraquinone, 1-amino-2-(trans-6-ethoxy-decahydro-2-naphthyloxy)carbonyl-4-(4-chlorophenyl)aminoanthraquinone, 1-amino-2-(trans-6-butoxy-decahydro-2-naphthyloxy)carbonyl-4-benzylaminoanthraquinone, 1-amino-2-(trans-6-butoxy-decahydro-2-naphthyloxy)-carbonyl-4-(4-methylbenzyl)aminoanthraquinone, 1-amino-2-(6-isobuthoxy-decahydro-2-naphthyloxy)carbonyl-4-(4-methylphenethyl)aminoanthraquinone, 1-amino-2-(trans-6-isobutoxy-decahydro-2-naphthyloxy)carbonyl-4-(4-chlorophenethyl)aminoanthraquinone, and 1-amino-2-(trans-6-octyloxy-decahydro-2-naphthyloxy)carbonyl-4-methylaminoanthraquinone. The preferred decahydronaphthyl group used is in a trans form.

The dichroic coloring agent of this invention represented by formula (I) wherein X is NH can be easily prepared by a conventional method as described below. 1-Amino-4-nitroanthraquinone-2-carboxylic acid is converted to an acid chloride by reacting with thionyl chloride and then allowed to react with a 2-decahydronaphthol derivative to give an ester derivative. The compound wherein $R_2$ is a hydrogen atom can be obtained by reducing the nitro group of the resultant ester derivative. The compound thus obtained is further reacted with an alkyl halide or an aralkyl halide to give compounds wherein $R_2$ is an alkyl or aralkyl group. The compound wherein $R_2$ is an aryl group can easily be obtained by reacting 1-amino-4-bromoanthraquinone-2-carboxylic acid with arylamine, followed by esterifying with a 2-decahydronaphthol derivative. Crude coloring agents can be purified by recrystallization, column chromatography and other processes to provide high purity coloring matters.

Representative examples of anthraquinone coloring agents in this invention wherein X is S include 1-amino-4-ethylthio-2-(decahydro-2-naphthyloxy)carbonylanthraquinone, 1-amino-2-(trans-decahydro-2-naphthyloxy)carbonyl-4-n-propylthioanthraquinone, 1-amino-2-(trans-decahydro-2-naphthyloxy)carbonyl-4-methylthioanthraquinone, 1-amino-2-(trans-decahydro-2-naphthyloxy)carbonyl-4-ethylthioaminoanthraquinone, 1-amino-2-(decahydro-2-naphthyloxy)carbonyl-4-butylthioanthraquinone, 1-amino-2-(trans-decahydro-2-naphthyloxy)carbonyl-4-(4-ethoxyphenyl)thioanthraquinone, 1-amino-2-(trans-decahydro-2-naphthyloxy)-carbonyl-4-(4-chlorophenyl)thioanthraquinone), 1-amino-2-(trans-decahydro-2-naphthyloxy)carbonyl-4-benzylthioanthraquinone, 1-amino-2-(trans-decahydro-2-naphthyloxy)carbonyl-4-(4-methylbenzyl)thioanthraquinone, 1-amino-2-(decahydro-2-naphthyloxy)carbonyl-4-(4methylphenethyl)thioanthraquinone, 1-amino-2-(6-chloro-decahydro-2-naphthyloxy)-carbonyl-4-ethylthioanthraquinone, 1-amino-2-(trans-6-chloro-decahydro-2naphthyloxy)-carbonyl-4-n-butyl-thioanthraquinone, 1-amino-2-(trans-6-chloro-decahydro-2-naphthyloxy)carbonyl-4-methylthioanthraquinone, 1-amino-2-(trans-6-chloro-decahydro-2-naphthyloxy)carbonyl-4-ethylthioanthraquinone, 1-amino-2-(6-chloro-decahydro-2-naphthyloxy)carbonyl-4-methylphenyl)thioanthraquinone, 1-amino-2-(trans-6-fluoro-decahydro-2-naphthyloxy)carbonyl-4-4-ethoxyphenyl)thioanthraquinone, 1-amino-2-(trans-6-fluoro-decahydro-2-naphthyloxy)carbonyl-4-(4 chlorophenyl)thioanthraquinone, 1-amino-2-(trans-6-fluoro-decahydro-2-naphthyloxy)carbonyl-4-benzylthioanthraquinone, 1-amino-2-(trans-6-bromo-decahydro-2-naphthyloxy)-carbonyl-4-(4-methylbenzyl)thioanthraquinone, 1-amino-2-(6-bromo-decahydro-2-naphthyloxy)carbonyl-4-(4methylphenethyl)thioanthraquinone, 1-amino-2-(6-methyl-decahydro-2-naphthyloxy)-carbonyl-4-(4-ethylphenyl)thioanthraquinone, 2-naphthyloxy)carbonyl-4-(4-butoxyphenyl)thioanthraquinone, 1-amino-2-(trans-6-methyl-decahydro-2-naphthyloxy)carbonyl-4-methylthioanthraquinone, 1-amino-2-(trans-6-methyl-decahydro-2-naphthyloxy)-carbonyl-4-butylthioanthraquinone, 1-amino-2-(6-methyl-decahydro-2-naphthyloxy)carbonyl-4-(4-methylphenyl)thioanthraquinone, 1-amino-2-(trans-6-ethyl-decahydro-2-naphthyloxy)carbonyl-4-(4-butoxyphenyl)thioanthraquinone, 1-amino-2-(trans-6-ethyl-decahydro-2-naphthyloxy)carbonyl-4-(4-chlorophenyl)thioanthraquinone, 1-amino-2-(trans-6-butyl-decahydro-2-naphthyloxy)carbonyl-4-benzylthioanthraquinone, 1-amino-2-(trans-6-isopropyl-decahydro-2-naphthyloxy)carbonyl-4-(4-methylbenzyl)thioanthraquinone, 1-amino-2-(6-isobutyl-decahydro-2-naphthyloxy)carbonyl-4-(4-methylphenethyl)thioanthraquinone, 1-amino-2-(6-methoxy-decahydro-2-naphthyloxy)carbonyl-4-phenylthioanthraquinone, 1-amino-2-(trans-methoxy-decahydro-2-naphthyloxy)carbonyl-4-phenylthioanthraquinone, 1-amino-2-(trans-6-methoxy-decahydro-2-naphthyloxy)carbonyl-4-methylthioanthraquinone, 1-amino-2-(trans-6-methoxy-decahydro-2-naphthyloxy)carbonyl-4ethylthioanthraquinone, 1-amino-2-(6-methoxy-decahydro-2-naphthyloxy)carbonyl-4-(4-methylphenyl)thioanthraquinone, 1-amino-2-(trans-6-ethoxy-decahydro-2-naphthyloxy)-carbonyl-4-(4-ethoxyphenyl)thioanthraquinone, 1-amino-2-(trans-6-ethoxy-decahydro-2-naphthyloxy)carbonyl-4-(4-chlorophenyl)thioanthraquinone, 1-amino-2-(trans-6-butoxy-decahydro-2-naphthyloxy)carbonyl-4-benzylthioanthraquinone, 1-amino-2-(trans-6-butoxy-decahydro-2-naphthyloxy)carbonyl-4-(4-methylbenzyl)thioanthraquinone, 1-amino-2-(6-isopropoxy-decahydro-2-naphthyloxy)-carbonyl-4-(4-methylphenethyl)thioanthraquinone, 1-amino-2-(trans-6-isobutoxy-decahydro-2-naphthyloxy)carbonyl-4-(4-chlorophenethyl)thioanthraquinone, and 1-amino-2-(trans-6-octyloxy-decahydro-2-naphthyloxy)-carbonyl-4-methylthioanthraquinone. The preferred decahydronaphthyl group used is in a trans form.

The dichroic coloring agents of this invention represented by formula (I) wherein X is S can be easily prepared by a conventional method as described below. 1-Amino-4-nitroanthraquinone-2-carboxylic acid is converted to an acid chloride by reacting with thionyl chloride and then allowed to react with a 2-decahydronaphthol derivative to give an ester derivative. Then the nitro group of the resultant ester derivative can be easily substituted by $R_2SH$ [$R_2$ is the same atom or group as formula (I)] in the presence of a base to give the coloring agent. The crude coloring agent thus obtained can be purified by recrystallization or column chromatography to obtain a high purity product.

The dichroic coloring agents of this invention are incorporated with liquid crystals to form a liquid crystal composition for color display. The composition can be used for conventional display units.

The liquid crystals which may be used include, for example, mixtures of cyano-biphenyl base liquid crystals such as 4-cyano-4'-n-pentylbiphenyl, 4-cyano-4'-n-propoxybiphenyl, 4-cyano-4'-n-pentyloxybiphenyl, 4-cyano-4'-n-octyloxybiphenyl and 4-cyano-4'-n-pentylterphenyl. This type of liquid crystal is available commercially as E-8 (trademark, Merck & Co., Inc.). Other types of liquid crystals which may be used include, for example, mixtures of cyclohexane base liquid crystals such as trans-4-n-propyl-(4-cyanophenyl)cyclohexane, trans-4-n-pentyl-(4-cyanophenyl)cyclohexane, trans-4-n-heptyl-(4-cyanophenyl)cyclohexane, and trans-4-n-pentyl-(4'-cyanobiphenyl)cyclohexane. The latter type of liquid crystals is available commercially as ZLI-1132 and ZLI-1840 (trademark, Merck & Co., Inc.).

Optically active substances such as cholesteryl nonanoate and optical rotatory 4-cyano-4'-isopentyl-biphenyl may be added to the liquid crystals listed above to prepare a so-called chiral nematic liquid crystal mixture. The mixture is in a cholesteric phase state when no electric field is applied, and is converted to a nematic phase state when an electric field is applied. Liquid crystals are not limited to the examples listed above. Other examples which may be used include other types of biphenyl base liquid crystals, phenylcyclohexane base liquid crystals, liquid crystals based on Schiff's base, ester base liquid crystals, pyrimidine base liquid crystals, tetrazine base liquid crystals and various other liquid crystals. These liquid crystals may be used singly or in a combination of two or more.

The coloring agents of this invention may be used singly or in combination of two or more.

The concentration of the coloring agent used should be in such a range that the coloring agent can be completely dissolved in the liquid crystals and that the orientation of the molecules of the coloring agent can be sufficiently adjusted on the basis of the molecular orientation of the liquid crystal. The concentration is generally 0.01–10% by weight and preferably 0.1–5% by weight of the liquid crystals.

The dichroic coloring agent of this invention may be mixed with other dichroic or nondichroic coloring agents. Dichroic coloring agents having any desired hue can be provided by this method. When the dichroic coloring agent is dissolved in the liquid crystals, a prescribed amount of the coloring agent is added to the liquid crystal and stirred for a long period of time. The stirring may also be conducted above the temperature where the liquid crystals form an isotropic state to obtain a desired liquid crystal composition for color displays.

EXAMPLES

The synthesis examples of the anthraquinone base dichroic coloring agents of this invention will hereinafter be described. In Table 1, typical coloring agents are illustrated by structure, colors in solution, and dichroic ratios at the maximum absorption wave length in the liquid crystal ZLI-1840 of Merch & Co., Inc.

The dichroic ratios are measured by the following methods. Each 1.0% by weight of the coloring agents is dissolved in a typical liquid crystal (ZLI-1840: trademark, Merch & Co., Inc.). The resultant solution is sealed in a liquid crystal cell having a thickness of 10 $\mu$m which has been pretreated to obtain a homogeneous orientation, placed in the optical path of a spectrophotometer, exposed to linearly polarized light which is parallel to the orientation of the liquid crystal, and its absorbance $A_{||}$ is measured. Then the cell is exposed to the linearly polarized light which is perpendicular to the orientation of the liquid crystal and its absorbance $A\perp$ is measured.

The dichroic ratio is calculated from the following equation:

$$\text{Dichroic acid} = \frac{A_{||}}{A_\perp}$$

All the dichroic coloring agents of this invention exhibit an extremely high dichroic ratio. Part and parts in the examples mean part by weight and parts by weight, respectively.

EXAMPLE 1

A mixture containing 150 parts of o-dichlorobenzene, 18.7 parts of 1-amino-4-nitroanthraquinone-2-carboxylic acid, 0.3 part of pyridine and 17.9 parts of thionyl chloride was stirred for 30 minutes and heated to 100°–105° C. for 2 hours with stirring. After completely distilling off excess thionyl chloride under reduced pressure, 18.5 parts of decahydro-2-naphthol (cis:trans=1:1) was added and heated to 100°–105° C. for 2 hours with stirring. To the reaction mixture, 10 parts of 90% hydrazine hydrate was added and heated to 100°–105° C. for 2.5 hours with stirring to complete the reaction. After cooling, the reaction mixture obtained was poured into 180 parts of methanol, stirred for 1 hour, cooled with ice, filtered, washed with methanol and dried. The crude product thus obtained was 20.5 parts. The crude product was purified by column chromatography using silica gel and a toluene developer. The amount of 1,4-diamino-2-(decahydro-2-naphthyloxy)-carbonylanthraquinone was 10.5 parts (45% yield) (coloring agent 1 in Table 1).

In a small beaker, 1 part of the above obtained coloring agent was added to 100 parts of liquid crystal ZLI-1840 of Merck & Co., Inc. and heated to about 80° C.

with stirring to obtain a completely clear solution. The solution was allowed to cool and the colored liquid crystal thus obtained was sealed in a liquid crystal display element under reduced pressure. The display unit indicated a blue color when no voltage was applied. When a voltage was applied, only the electrode portion of the display unit turned colorless and exhibited a good contrast. The dichroic ratio of the purified coloring agent indicated 10.3 at the maximum absorption wave length of 638 nm. A weathering test of 200 hours with a sunshine weather meter led to changes of 1% or less in the absorption spectrum and the dichroic ratio, thereby exhibiting good results.

EXAMPLE 2

The same reaction procedures as described in Example 1 were carried out, except that trans-decahydro-2-naphthol was used in place of decahydro-2-naphthol (cis:trans=1:1). The reaction product was purified to obtain 1,4-diamino-2-(trans-decahydro-2-naphthyloxy)-carbonylanthraquinone (coloring agent 2 in Table 1). The dichroic ratio of the coloring agent indicated a good result and was 15.2 at the maximum absorption wave length of 638 nm. The same weathering test as in Example 1 also exhibited similarly good results.

EXAMPLE 3

A mixture containing 7.6 parts of 1,4-diamino-2-(trans-decahydro-2-naphthyloxy)carbonylanthraquinone obtained in Example 2, 47.5 parts of sulfolane, 6.5 parts of patassium carbonate and 8.4 parts of methyl iodide was stirred at 60°–65° C. for 3 hours. The reaction mixture was cooled, filtered, washed with water and dried. The crude product thus obtained was purified by column chromatography using silica gel and a toluene developer. 1-Amino-2-(trans-decahydro-2-naphthyloxy)-carbonyl-4-methylaminoanthraquinone (coloring agent 3 in Table 1) was obtained in an amount of 4.7 parts (60% yield). The dichroic ratio of the coloring agent thus obtained was 14.1 at the maximum absorption wave length of 672 nm. The same weathering test as Example 1 also exhibited good results.

EXAMPLES 4–28

The coloring agents of formula (I) wherein X is NH (coloring agents 4–28) were prepared by carrying out the same procedures as described in Examples 1–3. The structures, dichroic ratios and other properties of these coloring agents are summarized in Table 1.

EXAMPLE 29

A mixture containing 312 parts of dimethylsulfoxide, 10.4 parts of potassium carbonate and 16.3 parts of 4-n-butoxythiophenol was maintained at 60° C. and 15.6 parts of 1-amino-4-nitroanthraquinone-2-carboxylic acid was added. The mixture was reacted for 7 hours at 55°–60° C. and poured into 500 parts of water. To the resultant aqueous mixture, 70 g of sodium chloride was added and allowed to stand for 2 hours. Then the mixture was filtered, washed with water and dried.

To the mixture containing 8.9 parts of the reaction product and 50 parts of o-dichlorobenzene, 0.2 part of pyridine and 6.7 parts of thionyl chloride were successively added and reacted at 100° C. for 2 hours. After distilling off excess thionyl chloride under reduced pressure, 7.7 parts of decahydro-2-naphthol were added and reacted at 100°–105° C. for 2 hours. The reaction mixture was cooled and poured into 300 parts of methanol. The precipitated solid mass was filtered, washed with methanol, washed with water and dried. The crude product obtained was 9.3 parts. The crude product was purified by column chromatography using silica gel and a toluene developer. 1-Amino-2-(decahydro-2-naphthyloxy)carbonyl-4-(4-n-butoxyphenyl)-thioanthraquinone) (coloring agent 29 in Table 1) was obtained in an amount of 6.4 parts (54% yield).

In a small beaker, 1 part of the above-obtained coloring agent was added to 100 parts of liquid crystal ZLI-1840 of Merck & Co., Inc. and heated to about 80° C. with stirring to obtain a completely clear solution. The solution was allowed to cool and the colored liquid crystal thus obtained was sealed in a liquid crystal display element under reduced pressure. The display unit indicated a blue violet color when no voltage was applied. When a voltage was applied, only the electrode portion of the display unit turned colorless and exhibited good contrast. The dichroic ratio of the purified coloring agent indicated 11.2 at the maximum absorption wave length of 590 nm. The same weathering test as described in Example 1 led to changes of 1% or less in absorption spectrum and dichroic ratio, thus exhibiting good results.

EXAMPLE 30

The same reaction procedures as described in Example 29 were carried out, except that trans-decahydro-2-naphthol was used in place of decahydro-2-naphthtol (cis:trans=1:1). The reaction product was purified to obtain 1-amino-2-(trans-decahydro-2-naphthyloxy)carbonyl-4-(4-n-butoxyphenyl)thioanthraquinone (coloring agent 30 in Table 1). The dichroic ratio of the coloring matter indicated a good result and was 15.8 at the maximum absorption wave length of 590 nm. The same weathering test as in Example 1 also exhibited similar good results as in Example 29.

EXAMPLE 31

The same reaction and purification procedures as described in Example 29 were carried out, except that n-butylmercaptan was used in place of 4-n-butoxythiophenol. 1-Amino-2-(trans-decahydro-2-naphthyloxy)-carbonyl-4-n-butylthioanthraquinone (coloring agent 31 in Table 1) was obtained in an amount of 4.7 parts (yield 60%). The dichroic ratio of the coloring agent was 14.4 at the maximum absorption wave length of 576 nm. The weathering test gave similar good results as in Example 1.

EXAMPLES 32–56

The coloring agents of formula (I) wherein X is S (coloring agents 32–56) were prepared by carrying out the procedures as described in Examples 29–31. The structures, dichroic ratios and other properties of these coloring agents are summarized in Table 1.

TABLE 1

| Coloring agent | Substituent in formula (I) | | | Decahydro-naphthyl steric structure | Dichroic ratio | Color in solution |
|---|---|---|---|---|---|---|
| | X | $R_1$ | $R_2$ | | | |
| 1 | —NH— | —H | —H | cis:trans = 1:1 | 10.5 | blue |

TABLE 1-continued

| Coloring agent | Substituent in formula (I) | | | Decahydro-naphthyl steric structure | Dichroic ratio | Color in solution |
|---|---|---|---|---|---|---|
| | X | R₁ | R₂ | | | |
| 2 | —NH— | —H | —H | trans | 15.2 | blue |
| 3 | —NH— | —H | —CH₃ | trans | 14.1 | blue |
| 4 | —NH— | —H | —C₂H₅ | trans | 15.0 | blue |
| 5 | —NH— | —H | 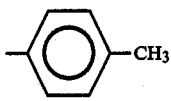 | cis:trans = 1:1 | 9.9 | blue |
| 6 | —NH— | —H | 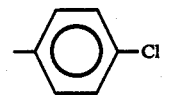 | trans | 15.3 | blue |
| 7 | —NH— | —H | 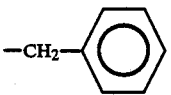 | trans | 14.7 | blue |
| 8 | —NH— | —H | 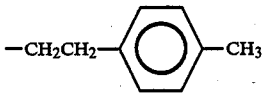 | cis:trans = 1:1 | 10.1 | blue |
| 9 | —NH— | —Cl | —H | cis:trans = 1:1 | 11.0 | blue |
| 10 | —NH— | —Cl | —H | trans | 15.0 | blue |
| 11 | —NH— | —Cl | —CH₃ | trans | 13.8 | blue |
| 12 | —NH— | —Cl | 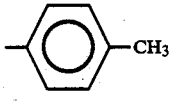 | cis:trans = 1:1 | 10.2 | blue |
| 13 | —NH— | —F | 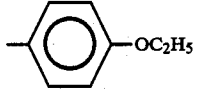 | trans | 13.9 | blue |
| 14 | —NH— | —F | 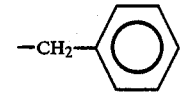 | trans | 14.6 | blue |
| 15 | —NH— | —Br | 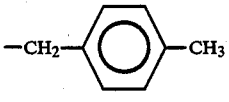 | trans | 14.5 | blue |
| 16 | —NH— | —CH₃ | —H | cis:trans = 1:1 | 10.8 | blue |
| 17 | —NH— | —CH₃ | —H | trans | 15.0 | blue |
| 18 | —NH— | —CH₃ | 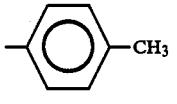 | cis:trans = 1:1 | 10.1 | blue |
| 19 | —NH— | —C₂H₅ | 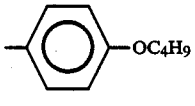 | trans | 14.1 | blue |
| 20 | —NH— | —C₃H₇(iso) | 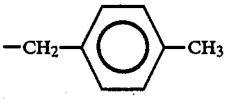 | trans | 14.6 | blue |
| 21 | —NH— | —OCH₃ | —H | cis:trans = 1:1 | 10.1 | blue |
| 22 | —NH— | —OCH₃ | —H | trans | 13.1 | blue |

TABLE 1-continued

| Coloring agent | Substituent in formula (I) | | | Decahydro-naphthyl steric structure | Dichroic ratio | Color in solution |
|---|---|---|---|---|---|---|
| | X | $R_1$ | $R_2$ | | | |
| 23 | —NH— | —OCH$_3$ | —C$_2$H$_5$ | trans | 13.5 | blue |
| 24 | —NH— | —OCH$_3$ | —C$_6$H$_4$—CH$_3$ | cis:trans = 1:1 | 9.4 | blue |
| 25 | —NH— | —OC$_2$H$_5$ | —C$_6$H$_4$—OC$_4$H$_9$ | trans | 13.2 | blue |
| 26 | —NH— | —OC$_4$H$_9$ | —CH$_2$—C$_6$H$_5$ | trans | 14.1 | blue |
| 27 | —NH— | —OC$_3$H$_7$(iso) | —CH$_2$CH$_2$—C$_6$H$_4$—CH$_3$ | cis:trans = 1:1 | 9.6 | blue |
| 28 | —NH— | —OC$_4$H$_9$(iso) | —CH$_2$CH$_2$—C$_6$H$_4$—Cl | trans | 12.1 | blue |
| 29 | —S— | —H | —C$_6$H$_4$—OC$_4$H$_9$(n) | cis:trans = 1:1 | 11.2 | blue-violet |
| 30 | —S— | —H | —C$_6$H$_4$—OC$_4$H$_9$(n) | trans | 15.8 | blue-violet |
| 31 | —S— | —H | —C$_4$H$_9$(n) | trans | 14.4 | blue-violet |
| 32 | —S— | —H | —C$_2$H$_5$ | trans | 15.7 | blue-violet |
| 33 | —S— | —H | —C$_6$H$_4$—CH$_3$ | cis:trans = 1:1 | 10.1 | blue-violet |
| 34 | —S— | —H | —C$_6$H$_4$—Cl | trans | 15.0 | blue-violet |
| 35 | —S— | —H | —CH$_2$—C$_6$H$_5$ | trans | 14.9 | blue-violet |
| 36 | —S— | —H | —CH$_2$CH$_2$—C$_6$H$_4$—CH$_3$ | cis:trans = 1:1 | 10.4 | blue-violet |
| 37 | —S— | —Cl | —CH$_3$ | cis:trans = 1:1 | 11.9 | blue-violet |
| 38 | —S— | —Cl | —C$_2$H$_5$ | trans | 15.6 | blue-violet |
| 39 | —S— | —Cl | —C$_4$H$_9$(n) | trans | 14.4 | blue-violet |

TABLE 1-continued

| Coloring agent | Substituent in formula (I) X | $R_1$ | $R_2$ | Decahydro-naphthyl steric structure | Dichroic ratio | Color in solution |
|---|---|---|---|---|---|---|
| 40 | —S— | —Cl | -⌬-CH₃ | cis:trans = 1:1 | 10.8 | blue-violet |
| 41 | —S— | —F | -⌬-OC₂H₅ | trans | 14.2 | blue-violet |
| 42 | —S— | —F | —CH₂-⌬ | trans | 14.3 | blue-violet |
| 43 | —S— | —Br | —CH₂-⌬-CH₃ | trans | 15.4 | blue-violet |
| 44 | —S— | —CH₃ | —CH₃ | cis:trans = 1:1 | 11.6 | blue-violet |
| 45 | —S— | —CH₃ | —CH₃ | trans | 14.9 | blue-violet |
| 46 | —S— | —CH₃ | -⌬-CH₃ | cis:trans = 1:1 | 10.7 | blue-violet |
| 47 | —S— | —C₂H₅ | -⌬-OC₄H₉ | trans | 14.9 | blue-violet |
| 48 | —S— | —C₃H₇(iso) | —CH₂-⌬-CH₃ | trans | 15.2 | blue-violet |
| 49 | —S— | —OCH₃ | —CH₃ | cis:trans = 1:1 | 10.9 | blue-violet |
| 50 | —S— | —OCH₃ | —C₂H₅ | trans | 14.7 | blue-violet |
| 51 | —S— | —OCH₃ | —C₃H₇(iso) | trans | 14.7 | blue-violet |
| 52 | —S— | —OCH₃ | -⌬-CH₃ | cis:trans = 1:1 | 10.2 | blue-violet |
| 53 | —S— | —OC₂H₅ | -⌬-OC₄H₉ | trans | 14.1 | blue-violet |
| 54 | —S— | —OC₄H₉ | —CH₂-⌬ | trans | 14.5 | blue-violet |
| 55 | —S— | —OC₃H₇(iso) | —CH₂CH₂-⌬-CH₃ | cis:trans = 1:1 | 10.6 | blue-violet |

TABLE 1-continued

| Coloring agent | Substituent in formula (I) | | | Decahydro-naphthyl steric structure | Dichroic ratio | Color in solution |
| --- | --- | --- | --- | --- | --- | --- |
| | X | $R_1$ | $R_2$ | | | |
| 56 | —S— | —OC$_4$H$_9$(iso) | —CH$_2$CH$_2$—⟨phenyl⟩—Cl | trans | 13.7 | blue-violet |

We claim:

1. Dichroic coloring agent for liquid crystal displays represented by the formula (I):

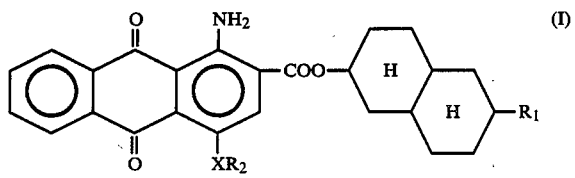

wherein X is S or NH; $R_1$ is a hydrogen atom, halogen atom, alkyl or alkoxy; and $R_2$ is a hydrogen atom, alkyl or aryl group.

2. The coloring agents as claimed in claim 1 wherein the decahydronaphthyl group in formula (I) is in a trans form.

3. The coloring agents as claimed in claim 1 wherein X in formula (I) is S.

4. The coloring agents as claimed in claim 1 wherein X in formula (I) is NH.

5. The coloring agents as claimed in claim 2 wherein X in formula (I) is S.

6. The coloring agents as claimed in claim 2 wherein X in formula (I) is NH.

7. The coloring agents as claimed in claim 3 wherein $R_2$ in formula (I) is an aryl group.

8. The coloring agents as claimed in claim 4 wherein $R_2$ in formula (I) is a hydrogen atom.

9. The coloring agents as claimed in claim 4 wherein $R_2$ in formula (I) is an aryl group.

10. The coloring agents as claimed in claim 5 wherein $R_2$ in formula (I) is an aryl group.

11. The coloring agents as claimed in claim 6 wherein $R_2$ in formula (I) is a hydrogen atom.

12. The coloring agents as claimed in claim 6 wherein $R_2$ in formula (I) is an aryl group.

* * * * *